Nov. 30, 1965 KARL-HERMANN FRIESE ETAL 3,220,937
PROCESS AND APPARATUS FOR OPERATING POROUS GAS DIFFUSION
ELECTRODES UNDER VARIATING PRESSURE WITH BACK
COUPLING OF PRESSURE
Filed Jan. 3, 1961

United States Patent Office 3,220,937
Patented Nov. 30, 1965

3,220,937
PROCESS AND APPARATUS FOR OPERATING POROUS GAS DIFFUSION ELECTRODES UNDER VARIATING PRESSURE WITH BACK COUPLING OF PRESSURE
Karl-Hermann Friese, Oberhausen-Holten, Eduard Justi, Stuttgart-Feverbach, and Herbert Spengler and August Winsel, Braunschweig, Germany, assignors, by mesne assignments, to Varta Aktiengesellschaft and Siemens-Schuckert-Werke Aktiengesellschaft, Erlanger, Germany, both German corporations
Filed Jan. 3, 1961, Ser. No. 80,499
Claims priority, application Germany, Jan. 8, 1960, R 27,066
22 Claims. (Cl. 204—1)

This invention relates to improvements in the utilization of porous gas diffusion electrodes in electrolyzers, fuel cells for gaseous fuels and devices for electrochemical storage of energy, with the aid of gaseous carriers of energy.

Gas diffusion electrodes are mainly used in fuel cells for electrolytically combusting gaseous fuels. In $H_2$-$O_2$-fuel cells, for instance, a gas diffusion electrode for hydrogen is opossed to a gas diffusion electrode for oxygen in an aqueous electrolyte. At the hydrogen electrode, the hydrogen molecule is catalytically cracked, so that the hydrogen atoms go into solution in the form of hydrogen ions while supplying electrons to the electrode body. At the oxygen electrode, hydroxyl ions are produced by the known reaction of oxygen molecules with the electrolyte in a similar manner whereby electrons are removed from the electrode body. Electric power is generated by completing a circuit between the electrodes allowing electron flow where the hydrogen and hydroxyl ions migrate in the electrolyte and combine to form water.

The gas diffusion electrodes used in this connection are porous metal bodies with numerous pores per square centimeter of geometrical surface, these parts preferably being of substantially equal width. Generally, each electrode body is arranged as a partition wall between two cell spaces, one of which contains the electrolyte and the other of which contains the particular gas to be reacted. Under the influence of the capillary forces, the electrolyte penetrates into the pores of the electrode.

If the gas pressure is equal to the sum of the opposing hydrostatic pressure in the electrolyte and the capillary pressure in the pores of the electrode, the electrolyte can be partly displaced from the electrode and the three phase interface of electrode, electrolyte, and gas which is necessary for the electrochemical solution reaction of the gas described above will conveniently develop. If, however, the gas pressure is chosen greater than the above mentioned sum, the gas to be converted will readily displace the electrolyte from the pores of the electrode and pass through the electrode body into the electrolyte. No effective three phase interface would therefore be present.

In order that gas diffusion electrodes may be kept safely functioning, the gas pressure and the pressure in the electrolyte space must be maintained constant in order to preserve the desired three phase interface. In open cells, as for example those described in U.S. Patents 2,928,891, 2,912,478, and 2,946,836, the electrolyte space is under atmospheric pressure.

Gas diffusion electrodes are also known (F. T. Bacon, British Patent No. 667,298) which consist of two porous layers. The layer on the electrolyte side has the smaller pore radius while the layer on the gas side has the larger pore radius. These electrodes are operated under a gas pressure, which is greater than the sum of the pressure in the electrolyte space and the capillary pressure in the layer with the coarser pores at the gas side but smaller than the corresponding sum in the layer with the finer pores at the electrolyte side. In these electrodes the three phase interface develops at the interface between the two layers.

Gaseous fuel cells provided with these two layer electrodes are operated at a constant pressure in the electrolyte space which may be equal to or above atmospheric pressure. It has already been proposed, moreover, to use these gas diffusion electrodes not only for electrochemically consuming gases but also for electrochemically evolving gases, especially in water electrolyzers. In the latter case, it is preferable to produce the electrolysis gases in compressed form, by operating the electrolysis as a high pressure electrolysis in a sealed cell under constant pressure.

It is further known, that electrical energy can be stored by electrolyzing water, separately collecting and storing the electrolysis gases in gas reservoirs and later recombining these gases in hydrogen-oxygen-cells with evolution of electrical energy. In U.S. Patent 2,070,612 a method is described for producing and storing electrical energy whereby the pressure electrolysis and recombination of the gases take place alternately in one and the same apparatus. While the apparatus in this instance is operated at elevated temperatures above 100 degrees C. and elevated pressure,, gas diffusion electrodes are not employed.

An improved process and apparatus for storage of electrical energy is described in U.S. Application Serial No. 784,939, filed January 5, 1959, now abandoned, wherein the electrolytic production of the gases as well as the electrochemical recombination thereof is effected in the same cell by utilizing the same pair of gas diffusion electrodes. Due to the high catalytic activity of the gas diffusion electrodes used, these alternative processes can be effected at temperatures below 100 degrees C. with the result that the recombination can take place in open cells. When using the hitherto known gas diffusion electrodes for electrolysis of water, the electrolysis gases were always evolved at the side of the electrode facing the electrolyte and undesirably escaped into the electrolyte space.

This drawback can be overcome by using the so-called "valve" electrode according to U.S. application Serial No. 826,812, filed July 13, 1959. This electrode consists of layers of materials of different properties. Included is a layer with fine pores facing the electrolyte, consisting of a metal having as high as possible a value of minimum overvoltage of the gas evolved as well as a layer with coarser pores facing the gas space, which catalyzes the dissolution of the gas almost as a reversible gas electrode and provides an overvoltage of the gas to be converted, which is as small as possible.

The gas pressure is so chosen, that it is smaller than the sum of the opposing pressure in the electrolyte space and the capillary pressure of the electrolyte in the fine pored layer facing the electrolyte. Hereby the evolution of gas only takes place in the layer with the larger pores facing the gas space. The gas accumulates in the pores of this layer and is not able to pass through the fine pored layer and thence into the electrolyte space due to the capillary pressure of the electrolyte within such fine pores. Consequently, the forming gas enters the gas space even against overpressure therein. The maximum operational overpressure of the gas in the gas space which can be attained with the said electrode during evolution of gas, as compared to the pressure in the electrolyte space, is equal to the capillary pressure of the electrolyte in the pores of the layer facing the electrolyte. A higher overpressure would result in bubbling of gas through the electrode and into the electrolyte or at least in shifting the three phase interface of electrode, electrolyte, and gas to a less desirable pore location.

Since this electrode may also operate in an inverse sense as a dissolution electrode, it constitutes the first electrode which can be used for the inverse flow of the reaction gases. It is therefore especially well suited for use in the above described electrochemical storage plants operating with gaseous energy carriers, especially in $H_2$–$O_2$ storage plants. The drawback of all hitherto known processes for operating gas diffusion electrodes has resulted from the fact, that they must be performed at constant pressure in the electrolyte space and gas space. Therefore, in order to maintain the gas pressure constant variable gas storage devices, regulators, compressors, etc. were always necessary.

It is an object of the present invention to maintain a constant pressure difference between electrolyte space and gas space in a process for operating porous gas diffusion electrodes for the electrochemical evolution and/or dissolution of gases, especially where the pressure in the gas space varies within vast limits during the electrochemical reaction.

Other and further objects will become apparent from the within specification and accompanying examples taken together with the drawings.

It has been found, in accordance with the present invention that in order to obtain this object, the gas pressure existing in the gas space is transmitted to the electrolyte space with the exception of a constant pressure difference $\Delta p$ at the electrode. For this purpose understandably, the electrochemical device for the foregoing process must be sealed off gas-tight with respect to the atmosphere. Further, other things being equal, the gas diffusion electrode, which is generally arranged as a partition wall between the gas space and the electrolyte space must be the sole geometrical position, at which an interchange of matter (substance) between the two spaces can occur.

It is self-evident that the pressure difference between electrolyte space and gas space may not be greater than the capillary pressure of the electrolyte in the pores of the side of the gas diffusion electrode facing the electrolyte, or else the gas will penetrate the electrode and emerge into the electrolyte space. Therefore $$\Delta p = p_1 - p_0$$

where $p_1$ stands for the prevailing pressure in the gas space and $p_0$ for the pressure in the electrolyte space. $\Delta p$ may be greater than or equal to zero, and for efficiency, as above noted, should not exceed the corresponding capillary pressure of the electrolyte in the pores of the electrode facing the electrolyte.

The back coupling or transmission of the pressure of the gas space to the electrolyte space (save the pressure difference) can be realized in any manner. For instance, a partition wall or surface which is impermeable with respect to the gas and the electrolyte, can be movably arranged between the two spaces mentioned above, so that it is displaced if deviations occur in the pre-selected pressure difference to be maintained between the gas space and electrolyte space. Due to the small compressibility of the electrolyte, essentially filling the electrolyte space, in comparison to the compressibility of the gases, a small displacement of this boundary wall is sufficient to change the pressure in the electrolyte space considerably. The partition wall, therefore, need not cover a large area. Conveniently, the movable partition wall may take the form of a bellows-like body or a piston; it may also be in the form of the surface of a liquid non-miscible with the electrolyte, for instance mercury.

The desired pressure difference between gas space and electrolyte space is realized by exerting a constant opposite force on the movable surface, which is equal to the force exerted on to the latter by the pressue difference. By way of example, the pressure transmission to the electrolyte space can be effected by means of a bellows-like body provided in the electrolyte space, the interior chamber of such bellows-like body being in pressure equilibrium with the gas space. By the force of a loaded spring or by gravity a predetermined tension is imparted to the bellows-like body opposite to the direction of extension of such bellows-like body. A tension of such magnitude is employed that the pressure difference between the interior and the exterior of the bellows-like body is equal to the desired pressure difference between the electrolyte space and the gas space of the electrode. Thus, while the bellows-like body succeeds in transmitting part of the gas space pressure back to the electrolyte space, due to the predetermined tension exerted, a positive pressure difference will still remain in the gas space to be exerted on the electrode for attaining the three phase interface desired.

Where two gas diffusion electrodes are to be operated in the same cell according to the invention, the pressure of the gas spaces of the said electrodes must likewise be balanced with the aid of the movable interfaces as described above. If it is desired to operate with a small displacement of the interface, the respective volumes of the gas spaces are chosen in the ratio of the equivalent volumes of the gases at the same pressure so that in the ideal case, even without the said pressure transmission, no pressure difference between the gas spaces would occur during the electrochemical evolution or conversion of the gases. In this case only small corrections at the gas spaces would have to be effected.

If the pressure difference between the electrolyte space and the gas spaces of both of the said electrodes differ, the pressure transmission between the gas spaces of the electrodes must guarantee the required pressure difference. This can be effected in the manner above described for the pressure transmission between the electrolyte space and the gas space of the same electrode by the action of an additional constant force of suitable magnitude and direction upon the movable interface between the said gas spaces.

Further, the pressure transmission from the gas space of the electrodes to the electrolyte space can be carried out with an inert auxiliary gas contained in a storage tank which is in pressure communication with the electrolyte space. By means of a compressor, this gas is kept at a pressure which exceeds the highest possible operating pressure in the device and transmits the gas pressure existing in the gas space with the exception of the pressure difference $\Delta p$ upon the electrolyte space via a differential pressure switch, which is adjusted and regulated according to the desired pressure difference.

The invention will be further described with reference to the accompanying drawings which show the applicability of the process according to the invention in several devices provided with gas diffusion electrodes.

Figure 1:
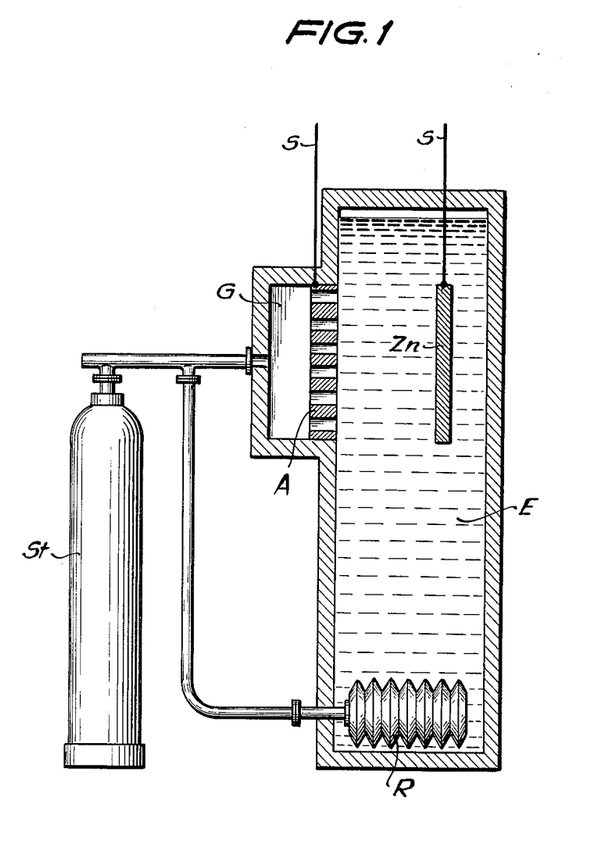
FIGURE 1 is a schematic partial sectional view of a gas diffusion electrode arrangement in an oxygen-zinc cell.

Referring to FIGURE 1, a galvanic cell is shown which is sealed from the atmosphere and which contains a zinc electrode designated Zn and a hydrophobic gas diffusion electrode A for oxygen, the cell space E containing a concentrated KOH solution as electrolyte. While in the hitherto known devices, oxygen was led from a pressure bomb via a reducing valve to the electrode whereby the compression energy was lost, the gas space G and the oxygen electrode A in the instant case can be directly connected with the pressure bomb St. The pressure of gas space G is simultaneously transmitted in turn to the electrolyte space E with the aid of the bellows R provided in the said electrolyte space which is in direct pressure communication with pressure bomb St and gas space G. Since the electrode A is hydrophobic, no pressure difference must be maintained between the gas space G and the electrolyte space E or else bubbling through the pores of electrode A into the electrolyte space E will occur. This is true because no capillary pressure in the electrode pores will be present inasmuch as the hydrophobic nature of the electrode A does away with the capillary pressure factor. Thus, the equation $\Delta p = p_1 - p_0$ is satisfied wherein $\Delta p$ is equal to zero. If, due to current discharge, the oxygen is used up little by little, the pressure decreases equally in the entire device in consequence of the pressure equalizing role of bellows R. However, since the entire pressure prevailing in the gas bomb is effective in the cell, the electric energy obtained is equivalent to the compressive work resulting from such gas pressure.

Figure 2:
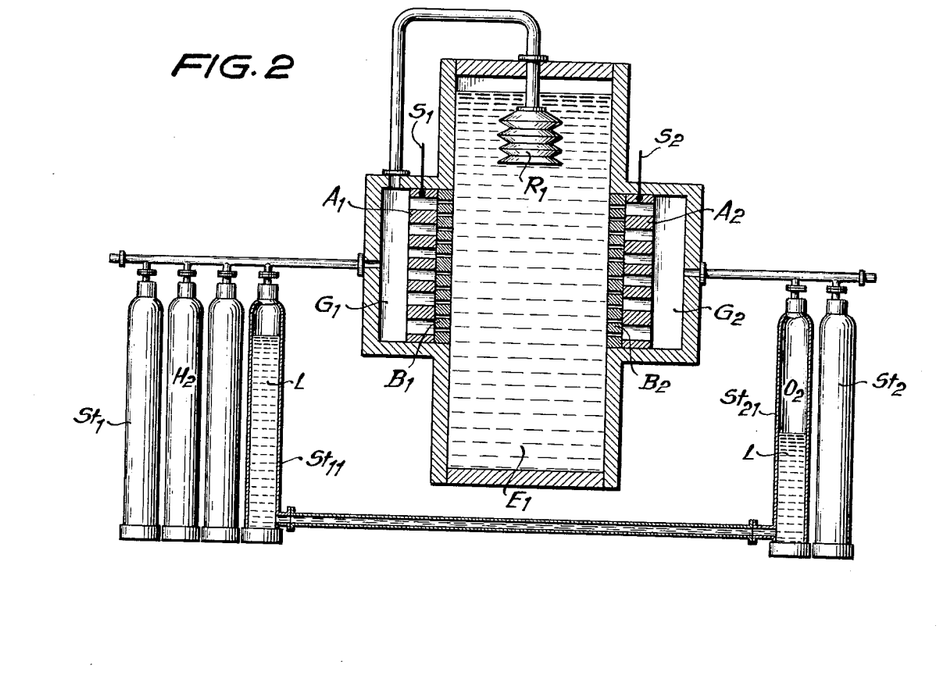
FIGURE 2 is a schematic partial sectional view of an arrangement including two gas diffusion electrodes in a water electrolyzer.

The process of the invention is of especial advantage for the electrolysis of water at so-called valve electrodes. This process is illustrated by FIGURE 2, which shows a device sealed from the atmosphere having a reversibly actuating valve electrode for hydrogen and a reversibly actuating valve electrode for oxygen respectively (of the type disclosed in said U.S. application Serial No. 826,-812). $A_1$ and $A_2$ designate the porous working layer, $B_1$ and $B_2$ the porous inactive covering layer; $G_1$ and $G_2$ the gas spaces, and $S_1$ and $S_2$ the terminals of the hydrogen- and oxygen-electrodes, respectively. $St_1$ to $St_{11}$ and $St_2$ to $St_{21}$ schematically represent storage bombs for hydrogen and oxygen respectively, $St_{11}$ and $St_{21}$ being connected by a common conduit. The bombs $St_{11}$ and $St_{21}$ are filled partly with a liquid L, for instance oil or water, for transmitting the pressure equalization between the gas spaces. $E_1$ represents the electrolyte space, wherein bellows $R_1$ is provided, its interior communicating with gas space $G_1$. Since at the evolution of gases no pressure difference at the electrodes is afforded, no additional constant forces act on the movable interface of bellows $R_1$. Thus, $\Delta p$ of the aforementioned equation is equal to zero.

To replenish the water used up during electrolysis, a corresponding quantity of water is pumped into the electrolyte space $E_1$ by a pump not shown.

The device illustrated in FIGURE 2 can be used for storing electrical energy with some variations, since the valve electrodes can also be actuated as dissolution electrodes for appropriate gases, as mentioned above (fuel cell operation). In this case, care has to be taken, that the three phase interface of electrode, electrolyte, and gas develops in the pores of the working layers $A_1$ and $A_2$ respectively. This is attained by providing for additional constant forces, acting upon the movable interface between the spaces and compensating for the capillary pressure of the electrolyte in the said working layers. Here, $\Delta p$ of the afore-mentioned equation is generally equal to the said capillary pressure.

Figure 3:
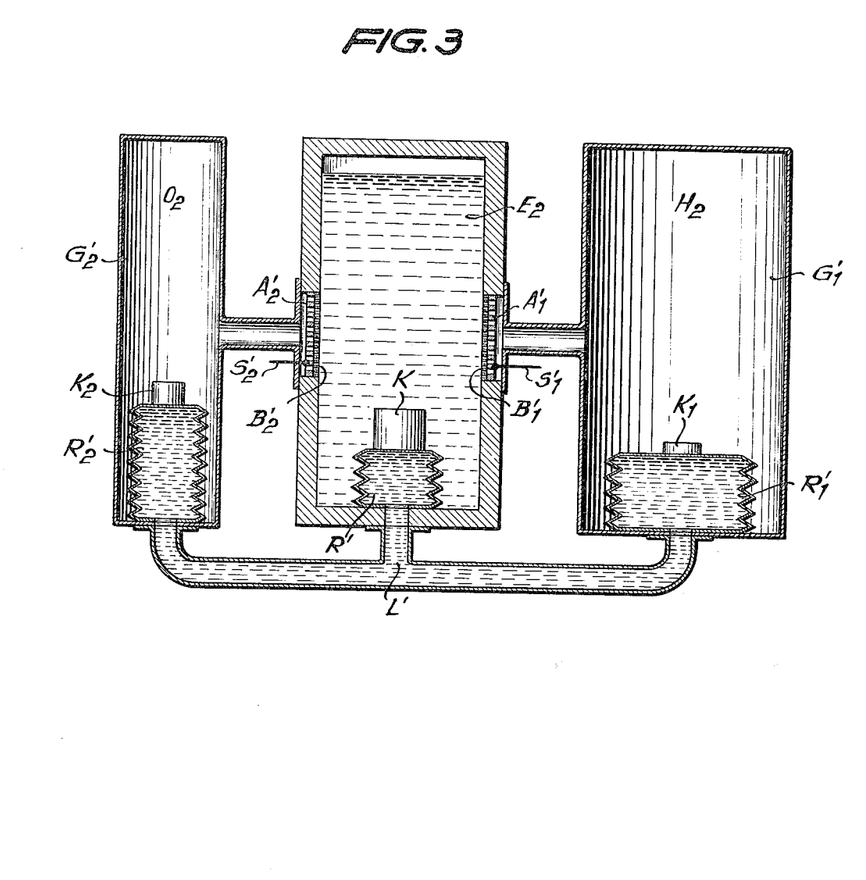
FIGURE 3 is a schematic partial sectional view of an arrangement including two gas diffusion valve electrodes in a device for storing electrical energy.

In this connection, FIGURE 3 shows such a storage device, sealed from the atmosphere, possessing valve electrodes and provided with means for back coupling or transmission of pressure. In FIGURE 3, like reference numerals as in FIGURE 2 but designated with prime symbols are used to indicate correspondingly similar parts. Moreover, $R'$, $R_1'$, $R_2'$ represent bellows-like bodies in common pressure communication with one another and containing liquid $L'$ for the transmission of pressure. The predetermined weights K, $K_1$ and $K_2$ provide for the desired pressure differences at the electrode between electrolyte space $E_2$ and the gas spaces $G_1'$ and $G_2'$ respectively. The predetermined weights K, $K_1$, and $K_2$ correspond to the capillary pressure in each instance. Since this pressure difference is independent of the absolute pressure in the electrolyte space, the device can be actuated in any pressure range.

In general, under the influence of the pressure difference prevailing at a gas diffusion electrode, some gas will escape through oversized pores into the electrolyte. This gas accumulates above the electrolyte level in the closed cell vessel. If the gas volume becomes equal to the volume which is occupied by the movable interface at maximum displacement of the same, the back coupling of transmission of pressure no longer takes place.

For this situation it is advantageous to provide a valve device for blowing off or releasing the accumulated gas, the latter opposing as high a resistance to the gas flow therethrough that no back pressure strokes occur in the electrolysis vessel at the blowing off of the gas. This blowing-off device, for example, may be a throttle valve, that can be manually and/or automatically opened and shut. The automatic opening and shutting of the valve is preferably actuated in dependence upon the movable interface, effecting the "back coupling" or transmission of pressure. For instance, a conventional pressure sensitive blowing-off valve may be provided at the upper wall of the electrolyte space of the device shown in FIGURES 1 to 3. It will open, if the bellows R is compressed to its minimum volume due to the back-up pressure of accumulated escaped gas within the electrolyte space, while it will shut, on the other hand, if the volume corresponds to the normal operating value.

In a simpler way, the opening and shutting of the blow-off device can be regulated merely with the aid of a conventional float device on the surface of the electrolyte. This float releases the opening or shutting respectively of the valve when the electrolyte reaches a predetermined minimum or maximum level.

The electrolysis cells illustrated in FIGURES 2 and 3 are representative of a great number of cells which likewise may be used in accordance with the invention and which, in the same manner, correspond with the gas spaces and the back-coupling systems set forth in FIGURES 2 and 3.

Figure 4:
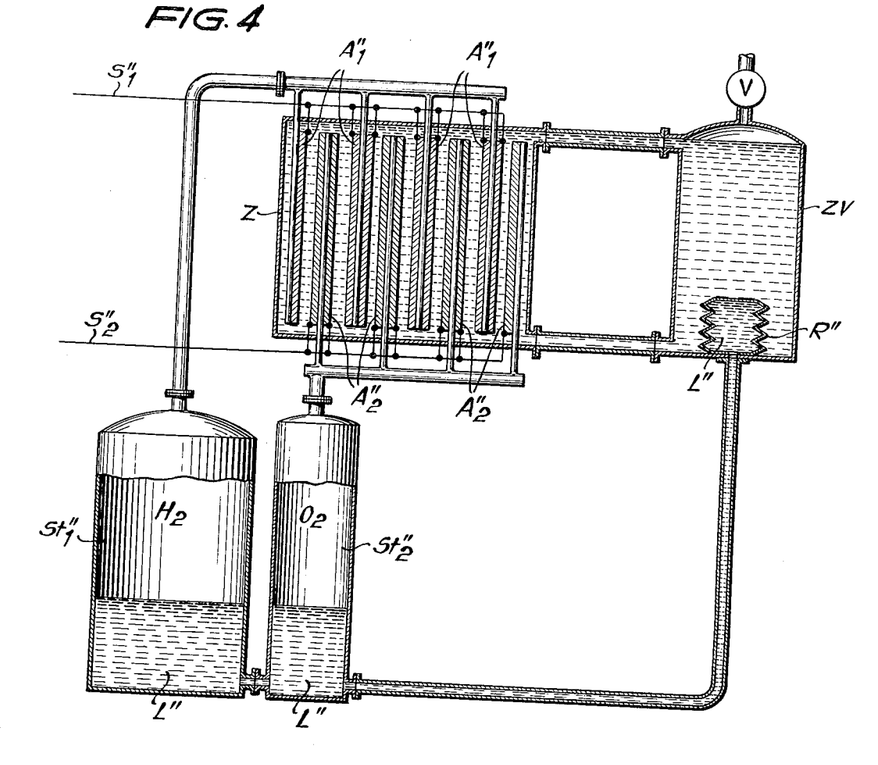
FIGURE 4 is a schematic partial sectional view of a device in which a series of hydrogen- and oxygen-gas diffusion electrodes respectively are provided in a common vessel.

FIGURE 4 illustrates the process of "back-coupling" or transmission of pressure in a device, comprising schematically a number of hydrogen and oxygen valve electrodes $A_1''$ and $A_2''$ respectively similar in operation to those above-described and especially to those of FIGURES 2 to 3, in a common cell vessel Z closed to the atmosphere and having only a small distance between the various electrodes of opposite polarity. They are arranged in such manner that the hydrogen and oxygen electrodes respectively have an equal electrical potential. The cell vessel Z communicates with the storage vessel for the electrolyte ZV. The pressure equalization between the gas spaces of the valve electrodes is effected with the aid of a liquid $L''$ in the pressure gas vessels $St_1''$ and $St_2''$. Simultaneously, the liquid $L''$ transmits the pressure with the aid of the bellows $R''$ (similar to the bellows of FIGURES 1 to 3) to the electrolyte in the vessels Z and ZV. Valve V serves to blow off the gases, which emerge into the electrolyte due to non-ideal behavior of the electrodes as mentioned above. $S_1''$ and $S_2''$ are the current supply means to the series of hydrogen and oxygen electrodes respectively. Valve V may be of any conventional construction and may be manually actuated or automatically actuated in dependence upon a predetermined pressure value.

Figure 5:
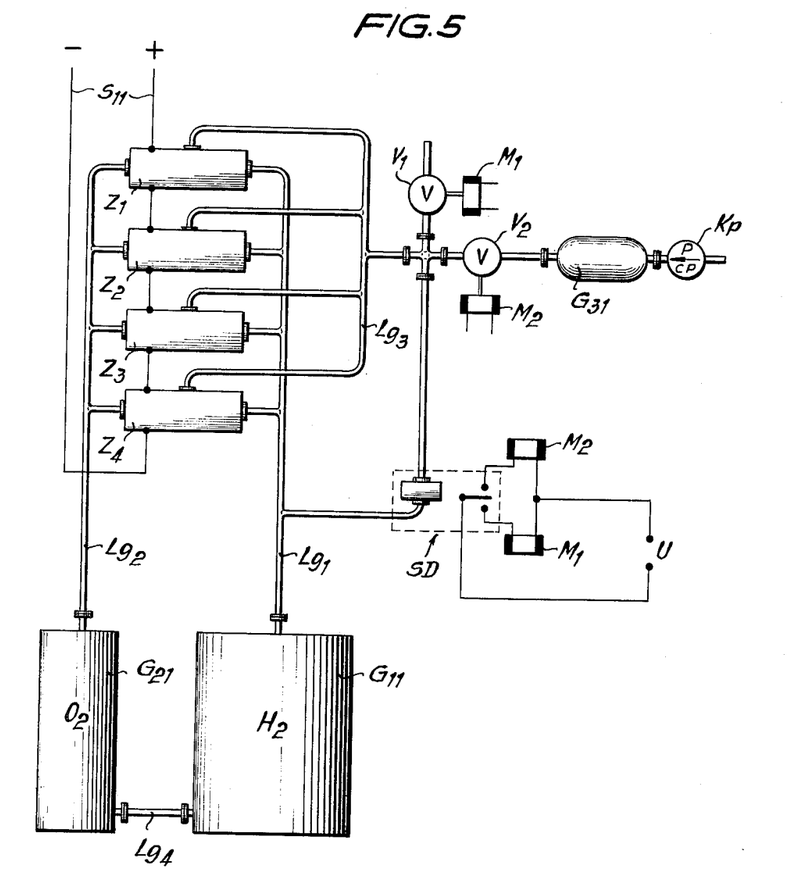
FIGURE 5 is a diagrammatic view of an electrode arrangement in a series of cells showing the back coupling of pressure with the aid of an auxiliary gas.

FIGURE 5 illustrates a further embodiment of the "back coupling" or transmission of pressure according to the invention. In the device of FIGURE 5 $Z_1$ to $Z_4$ represent groups of electrolysis cells or hydrogen-oxygen cells, respectively closed to the atmosphere, connected in parallel with one another and provided with the above-described valve electrodes for hydrogen as well as for oxygen. By conductor $S_{11}$ the said groups are connected in series. Gas supply pipe system $Lg_1$ leads $H_2$ from pressure gas holder $G_{11}$ to the hydrogen electrodes and vice versa while gas supply pipe system $Lg_2$ leads $O_2$ from pressure gas holder $G_{21}$ to the oxygen electrodes and vice versa. Pipe system $Lg_4$ serves for equalizing of pressure by communicating the pressure between $G_{11}$ and $G_{21}$ in the manner described hereinbefore.

Pipe system $Lg_3$ connects the electrolyte spaces of the cell groups $Z_1$ to $Z_4$ and therefore provides for equal pressure in the said electrolyte spaces. A differential pressure switch SD is provided in separate pressure communication with pipe systems $Lg_1$ and $Lg_3$ which responds to pressure differences between said systems $Lg_1$ and $Lg_3$ as described hereinbelow. $V_1$ and $V_2$ are magnetic switch valves which are actuated by power magnets $M_1$ and $M_2$ respectively. A pressure vessel $G_{31}$ for an auxiliary gas, for instance $N_2$, is maintained at a pressure exceeding the highest operating pressure in the cell system by compressor $Kp$. A source of electrical power U operates the power magnets $M_1$ and $M_2$ as schematically represented with respect to the electrical operation of switch SD.

If $\Delta p$ is the pressure difference between gas space and electrolyte space necessary at the electrodes, pressure switch SD is at rest (see the designated rest position of the contact between the arrows) as long as the pressure difference $\Delta p_{1,3}$ between $Lg_1$ and $Lg_3$ is greater than $\Delta p - q$ and smaller than $\Delta p + q$. In this relation, $q$ stands for the maximum allowed deviation of the pressure difference of the operating value $\Delta p$ at the electrodes, the magnitude of $q$ being dependent upon the particular kind of electrodes contemplated. In general, however, the ratio of $q/\Delta p$ equals 20%.

If during the use of such cells as electrolysis cells the pressure in $Lg_1$ rises, switch SD turns to the upper working contact, as soon as the pressure difference $\Delta p_{1,3}$ between $Lg_1$ and $Lg_3$ is greater than $\Delta p + g$. Then, magnet $M_2$ receives current from U and switch valve $V_2$ permits gas to flow from reservoir $G_{31}$ into pipe system $Lg_3$ until $\Delta p_{1,3}$ is again smaller than $\Delta p + q$. In this way the pressure in the entire system increases without deviation of the pressure difference at the electrodes by more than the value $q$ from the working value $\Delta p$. On the other hand, during reverse operation of the same cell groups $Z_1$ to $Z_4$ as fuel cells for the electrochemical conversion of the electrolysis gases, $H_2$ and $O_2$ from $G_{11}$ and $G_{21}$ respectively, are used up. Therefore, the pressure in such cell groups as well as in the system $Lg_1$ decreases. If thereby $\Delta p_{1,3}$ becomes smaller than $\Delta p - q$, switch SD turns to the lower working contact, magnet $M_1$ receives current and opens switch valve $V_1$ until the pressure difference $\Delta p_{1,3}$ again becomes greater than $\Delta p - q$. The auxiliary gas which originally passed from reservoir $G_{31}$ through valve $V_2$ into pipe system $Lg_3$ now passes through valve $V_1$ into the atmosphere or is collected and recirculated to compressor K.

The hereinabove described method of back-coupling or transmitting of pressure is especially suited for multistage plants. For the sake of simplicity, in FIGURE 5 only four cell steps are designated. Generally, however, the method according to the invention permits a number of variations which can be chosen by those skilled in the art. For instance instead of magnet valves, valves actuated by servomotors can be used. It is further expedient to combine valves $V_1$ and $V_2$ with suitable throttle means in order to inhibit local rushes of pressure in the system.

The following examples are intended to illustrate the invention and it is to be understood that the invention is not to be limited thereby.

*Example 1*

In an oxygen-zinc cell according to FIGURE 1 an electrode consisting of carbon and polyethylene was used as oxygen electrode. The said oxygen electrode was produced by hot pressing a mixture of pulverized activated carbon with a particle size of $20\mu$ to $60\mu$ and polyethylene with a particle size of $60\mu$ to $100\mu$ in the weight ratio 10:4 with a pressure of 200 kg./cm.² at a temperature of 160 degrees C. The electrode had a geometrical surface of 1 cm.². An amalgamated sheet of zinc of high purity was used as zinc anode. The electrolyte was 6 n KOH, the cylindrical cell vessel had a diameter of 60 mm. It consisted of an alkali resistant special steel. The zinc anode was insulated from the cell vessel by means of a stuffing box and the oxygen electrode was inserted in a hole of the cell vessel and conductively connected with the latter by means of a screwed cap of alkali resistant special steel, the cap serving simultaneously as gas space of the said electrode. The screwed cap serving as gas space was connected by a pipe with another screwed cap which contained in place of an electrode a membrane of Para rubber of 1 mm. thickness so that a pressure transmission between gas space and electrolyte space was obtained. The gas space was further connected with a steel bomb containing oxygen by means of a pipe.

This cell supplied a voltage of about 1.5 volts and could be loaded with a current density of 100 a./cm.². In the beginning the oxygen pressure was adjusted to 150 atmospheres gauge and later on the gas was gradually taken up until atmospheric pressure was reached. The electrode could be operated without disturbance over the whole pressure area.

*Example 2*

In a cell vessel a so-called valve electrode as described hereinabove was provided for hydrogen. This electrode consisted of a working layer having coarse pores, comprising a supporting skeleton of nickel, wherein porous Raney-nickel granules were embedded as well as a covering layer having fine pores comprising a supporting skeleton of copper wherein porous Raney-copper granules were embedded. The electrode was produced by conventional hot pressing of the granular particles under the simultaneous action of pressure and elevated temperature. For the working layer a thorough mixture of 1 part by weight of Raney nickel alloy (50% by weight Ni/50% by weight Al, mean particle size $50\mu$ to $75\mu$) and 1.5 parts by weight carbonyl nickel for the supporting skeleton, was added into a mold so as to be uniformly distributed therein. Upon this layer the starting material for the covering layer was evenly distributed. Such covering layer material consisted of a thorough mixture of 1 part by weight of a Raney copper alloy (50% of weight Cu/50% by weight Al, mean particle size $<35\mu$ and 1.2 parts by weight copper powder for the supporting skeleton.

This material was compacted for 7 to 10 minutes with a molding pressure of 4 tons/cm.² at 380 degrees C. In this manner an electrode with a working layer of 2 to 2.5 mm. thickness and a covering layer of 0.2 mm. thickness was produced.

As an oxygen electrode, there was provided in the said cell a valve electrode having a coarse pored working layer with a supporting skeleton of nickel having porous Raney-nickel and Raney-silver embedded therein and a fine pored covering layer of titanium. The electrode body was produced in the same manner as described above for the production of the hydrogen electrode. Following the pressing step, the electrodes were activated in known manner by dissolving the aluminum of the said Raney-alloy with 6 n KOH. The dissolving process was started at ambient temperature and continued until at a temperature of about 80 degrees C., the hydrogen evolution ceased. The treating KOH was several times renewed during the dissolving process.

Both electrodes had a geometrical surface of 1 cm.². They were inserted in a cell vessel of alkali resistant steel. The electrolyte was 6 n KOH. As described in Example 1 the gas spaces of the electrodes had the form of screwed caps by means of which the electrodes were inserted in the cell vessel. The pressure transmission was performed in such manner that a constant pressure difference of 1.2 atmospheres at the electrodes resulted so that the level of the electrolyte could be maintained stable, during the process. The said cell could be operated effectively both (a) as water electrolyzer and (b) as $H_2$-$O_2$ fuel cell. The pressure transmission was realized in the following manners:

(a) When using the cell for water electrolysis, two steel bombs of about 2 liters content, communicating at the bottom by a pipe system were filled with 2 liters water. Thereafter, one bomb was connected with the gas space of the hydrogen electrode, the other with the gas space of the oxygen electrode by means of a pipe system.

Simultaneously as mentioned in Example 1, a screwed cap, containing a rubber membrane was connected via a pressure reducing valve, adjusted to 1.2 atmospheres pressure with the hydrogen containing space.

When the cell was operated as water electrolyzer, the evolved gases were wholly delivered to the said gas bombs. In this case, the pressure was raised to only 40 atmospheres for reasons of safety. Up to this pressure the device could be operated without any disturbance. Small amounts of gas which escaped into the electrolyte space were blown off by means of a conventional screw valve at the top of the cell vessel.

(b) By using the device as $H_2$-$O_2$ fuel cell the rubber membrane was not coupled with the gas space of one of the electrodes but with a nitrogen bomb instead. At the beginning of the process, the desired pressure was adjusted by hand with the aid of a needle valve so that the pressure difference which was controlled by a differential manometer was maintained at 1.2 atmospheres. Later on the pressure difference was maintained automatically by the aid of a magnetic valve which was actuated by a pressure switch in a manner similar to that described with respect to the operation of the arrangement of FIGURE 5. The cell was operated in the pressure range from 1 to 40 atmospheres.

The same device could be used in the inverse sense for the electrolysis of water.

Generally, the value of $\Delta p$ is 0, if no capillary pressure is involved, as for instance in a cell according to FIGURE 1. It is at most equal to the capillary pressure of the electroylte in the pores of the side of the electrode facing the electroylte. If the above mentioned valve electrodes are used, as for instance in the devices according to FIGURES 2 and 3, the value of $\Delta p$ is smaller than the capillary pressure of the electroylte in the layer of the electrode having the fine pores but greater than the capillary pressure of the electrolyte in the layer having the coarse pores.

What is claimed is:

1. A process for operating a porous gas diffusion electrode usable both for the electrochemical evolution and dissolution of a gas in an electroyltic cell device in which the porous gas diffusion electrode is arranged as a stationary partition wall between the electrolyte space and the gas space, the said spaces being for the remainder sealed gas tight from the atmosphere and from direct communication with one another, and in which a constant pressure difference $\Delta p = p_1 - p_0 \geqq 0$ is to be maintained between the gas space pressure $p_1$ and the electrolyte space pressure $p_0$ independent of the absolute pressure $p_0$ in the electrolyte space, which pressure difference $\Delta p$ is at most as large as the capillary pressure of the electrolyte in the pores of the electrode on the side facing the electrolyte, which comprises operating such electrode in the cell device while constantly applying, remote from such electrode, indirectly and without direct contact between the corresponding gas and electrolyte a portion of the pressure $p_1$ in the gas space, equal to the value $p_0$, to the electrolyte space, the sole locus of direct contact between said gas and electrolyte being at the pores of said electrode, said gas space having a uniform pressure throughout.

2. A process for operating corresponding first and second porous gas diffusion electrodes of opposite polarity usable both for the electrolysis of water and the electrochemical conversion of the gases hydrogen and oxygen in an electrolytic cell device wherein each said electrode is arranged as a stationary partition wall between the electrolyte space of the cell and the particular gas space belonging to the electrode respectively, all of said spaces being for the remainder sealed gas tight from the atmosphere and from direct communication with one another, and wherein a constant pressure difference $\Delta p_1 = p_1 - p_0 \geqq 0$ is to be maintained between the gas space pressure $p_1$ of the first of said electrodes and the electrolyte space pressure $p_0$, independent of the absolute pressure $p_0$ in the electrolyte space, and a constant pressure difference $\Delta p_2 = p_2 - p_0 \geqq 0$ between the gas space pressure $p_2$ of the second of said electrodes and the electrolyte space pressure $p_0$, independent of the absolute pressure $p_0$ in the electrolyte space, whereby the pressure difference $\Delta p_1$ is at most as large as the capillary pressure of the electrolyte in the pores of said first electrode on the side thereof facing the electrolyte and the pressure difference $\Delta p_2$ is at most as large as the capillary pressure in the pores of said second electrode on the side thereof facing the electrolyte which comprises operating such electrodes in the cell device while constantly applying, remote from such electrodes, indirectly and without direct contact of the corresponding gases with one another and with the electrolyte a first portion of the pressure $p_1$ in the gas space of said first electrode, equal to the value $p_0$, to the electrolyte space and a second portion of the pressure $p_1$ in the gas space of said first electrode, equal to the value $p_2$, to the gas space of said second electrode, the sole locus of direct contact between the corresponding gases and the electrolyte being at the pores of the corresponding electrodes and each gas space having a uniform pressure throughout.

3. Process according to claim 1 wherein the application of the pressure from the gas space of the electrode to the electrolyte space is effected by geometric displacement of the electrolyte space volume as a function of the gas space pressure, such displacement being opposed by a predetermined constant counter-force to the gas space pressure of such magnitude that the pressure displacement is equal to the desired pressure difference $\Delta p$ between the electrolyte space and the gas space of the electrode.

4. Process according to claim 2 wherein the transmission of pressure from the gas space of the first electrode to the gas space of the second electrode is hydraulically effected by means of a liquid system.

5. Process according to claim 2 wherein the application of pressure from the gas spaces of said electrodes to the electrolyte space is effected by means of an inert auxiliary gas which is in pressure balance with the electrolyte space, said auxiliary gas being maintained at a pressure above the highest possible operating pressure for transmitting the pressure of the gas in the gas spaces to the electrolyte spaces with the exception of the pressure difference $\Delta p_1$ and the pressure difference $\Delta p_2$ upon the attaining of a preset pressure difference between the pressure in said gas spaces and the pressure in the electrolyte space.

6. Process according to claim 5 wherein double skeleton catalyst electrodes are utilized as gas diffusion electrodes consisting of a layer with fine pores at the side of the electrode facing the electrolyte and a layer with coarse pores at the side of the electrode facing the gas space whereby the pressure difference between the gas space and the electrolyte space is smaller than the capillary pressure of the electrolyte in the layer having the fine pores but greater than the capillary pressure of the electrolyte in the layer having the coarse pores.

7. A process for storing electrical energy by temporary conversion into chemical energy of electrolytic gas by subjecting water to pressure electrolysis with separate collection and storage of the gases evolved in said electrolysis and electro-chemically converting the electrolysis gases $H_2$ and $O_2$ according to claim 5 which comprises using as hydrogen and oxygen electrode respectively gas valve electrodes which consist of a working layer with coarse pores at the side of the electrode facing the gas, the said working layer catalyzing the dissolution of the respective gas and a covering layer having fine pores at the side of the electrode facing the electrolyte whereby the covering layer possesses a relatively high minimum overvoltage for the gas to be evolved at the respective electrode.

8. Process according to claim 7 whereby the ratio of the volumes of the gas spaces of the first and second electrodes is equal to the ratio of the volumes of the equivalent gases developed at the electrodes.

9. In a process for operating a porous gas diffusion electrode usable both for the electrochemical evolution and dissolution of a gas in an electrolytic cell device, in which the porous gas diffusion electrode is arranged as a stationary partition wall between the electrolyte space and the gas space, the said spaces being for the remainder sealed gas tight from the atmosphere and from direct communication with one another, the improvement which comprises operating such electrode in the cell device while maintaining a constant pressure difference, $$\Delta p = p_1 - p_0 \geqq 0$$

between the gas space pressure $p_1$ and the electrolyte space pressure $p_0$ independent of the absolute pressure $p_0$ in the electrolyte space, said pressure difference $\Delta p$ being at most as large as the capillary pressure of the electrolyte in the pores of the electrode on the side facing the electrolyte, by constantly directly applying, remote from said electrode, indirectly and without direct contact between the corresponding gas and electrolyte, a portion of the pressure $p_1$ in the gas space, which portion is equal to the value $p_0$, to the electrolyte space to counterbalance changes in pressure between said spaces within wide limits as a direct function of such changes and to restore said constant pressure difference, the sole locus of direct contact between the corresponding gas and electrolyte being at the pores of said porous electrode and said gas space having a uniform pressure throughout.

10. Improvement according to claim 9 wherein the application of the pressure from the gas space of the electrode to the electrolyte space is effected by displacement of the electrolyte space volume as a function of the gas space pressure, such displacement being opposed by a predetermined opposite force of equal magnitude to the desired pressure difference $\Delta p$, between the electrolyte space and the gas space of the electrode, any gas collecting in said electrolyte space being maintained at a volume corresponding to a pressure less than the opposing pressure of the gas space under the operating conditions.

11. Improvement according to claim 10 wherein said application of pressure is hydraulically effected by means of a liquid system coupled between said electrolyte space and said gas space.

12. Improvement according to claim 9 wherein the application of the pressure from the gas space of the electrode to the electrolyte space is effected by means of an inert auxiliary gas, said gas being introduced into the electrolyte space at a pressure above the highest possible operating pressure therein, said auxiliary gas serving to transmit the pressure of the gas in the gas space to the electrolyte space with the exception of the pressure difference $\Delta p$ upon attaining a preset pressure difference between the pressure in said gas space and the pressure in said electrolyte space.

13. Improvement according to claim 12 wherein upon attaining a preset minimum pressure difference between the pressure in said gas space and the pressure in said electrolyte space, said auxiliary gas is released from said electrolyte space until the pressure in both said spaces is in balance with the exception of the pressure difference $\Delta p$.

14. Improvement according to claim 9 wherein the porous gas diffusion electrode is a double skeleton catalyst electrode consisting of a layer having fine pores at the side of the electrode facing the electrolyte and a layer with coarse pores at the side of the electrode facing the gas space, whereby the pressure difference between the gas space and the electrolyte space is smaller than the capillary pressure of the electrolyte in the layer having the fine pores but greater than the capillary pressure of the electrolyte in the layer having the coarse pores.

15. Improvement according to claim 9 wherein the gas diffusion electrode is hydrophobic and in the absence of capillary pressure of the electrolyte in the pores of the electrode said pressure difference $\Delta p$ is equal to zero.

16. In a process for operating a pair of porous gas diffusion electrodes of opposite polarity usable both for the electrolysis of water and the electrochemical conversion of the gases hydrogen and oxygen in an electrolytic cell device, wherein each electrode of said pair is arranged as a stationary partition wall between the electrolyte space of the cell and the corresponding gas space for said electrode, all of said spaces being for the remainder sealed gas tight from the atmosphere and from direct communication with one another, the improvement which comprises operating such electrodes in the cell device while maintaining a constant pressure difference $$\Delta p_1 = p_1 - p_0 \geqq 0$$

between the gas space pressure $p_1$ of the first of said electrodes and the electrolyte space pressure $p_0$ independent of the absolute pressure $p_0$ in the electrolyte space, and a constant pressure difference $\Delta p_2 = p_2 - p_0 \geqq 0$ between the gas space pressure $p_2$ of the second of said electrodes and the electrolyte space pressure $p_0$ independent of the absolute pressure $p_0$ in the electrolyte space, said pressure difference $\Delta p_1$ being at most as large as the capillary pressure of the electrolyte in the pores of the first electrode on the side thereof facing the electrolyte and said pressure difference $\Delta p_2$ being at most as large as the capillary pressure in the pores of said second electrode on the side thereof facing the electrolyte, by constantly transmitting, remote from said electrodes, indirectly and without direct contact of the corresponding gases with one another and with the electrolyte a first portion of the pressure $p_1$ in the gas space corresponding to the first electrode, which first portion is equal to the value $p_0$, to the electrolyte space and a second portion of the pressure $p_1$ in the gas space corresponding to the first electrode, which second portion is equal to the value $p_2$, to the gas space corresponding to the second electrode, the sole locus of direct contact between the corresponding gases and the electrolyte being at the pores of the corresponding electrodes and each gas space having a uniform pressure throughout.

17. Improvement according to claim 16 wherein the pressure portion equal to the value $p_2$ is constantly transmitted from the gas space corresponding to the second electrode to the gas space corresponding to the first electrode.

18. Improvement according to claim 16 wherein the electrodes used are gas valve electrodes, each consisting of a catalytically active working layer having coarse pores on the side of the electrode facing the corresponding gas, said working layer catalyzing the dissolution of said corresponding gas, and a covering layer having fine pores on the side of the electrode facing the electrolyte, said covering layer possessing a high minimum overvoltage for the gas to be evolved at the respective electrode.

19. Improvement according to claim 18 wherein the ratio of the volumes of the respective gas spaces of said electrodes is equal to the ratio of the volumes of the equivalent gases developed at the electrodes.

20. An electrolytic cell arrangement for electrochemical evolution and dissolution of a gas which comprises an electrolyte space, two electrodes, at least one gas space, conduit means, and a pressure sensitive displaceable gas-tight partition means, at least one of said electrodes being a porous gas diffusion electrode arranged as a stationary partition wall between said electrolyte space and said gas space to provide the sole area of direct communication between the corresponding gas and electrolyte, the said spaces being for the remainder sealed gas tight from the atmosphere and from direct communication with one aonther, said gas space continuously pressure communicating through said conduit means with said electrolyte space separately from said stationary partition wall and out of direct flow communication and contact with any liquid in said electrolyte space by means of said pressure sensitive displaceable gas-tight partition means, said gas-tight partition means being separate and distinct from any fluid in said electrolyte space and interposed at said conduit means between said gas space and said electrolyte space remote from said stationary partition wall, said gas space being in constant and continuous direct open flow communication with the corresponding side of said gas-tight partition means to maintain a uniform pressure therebetween.

21. Arrangement according to claim 20 wherein said partition means is in the form of a bellows means.

22. Arrangement according to claim 20 wherein said partition means includes a bellows means and on the side thereof adjacent the gas space a non-miscible inert liquid for pressure communicating said gas space with said electrolyte space.

References Cited by the Examiner

UNITED STATES PATENTS

| 1,970,804 | 8/1934 | Kerk | 204—290 |
| 2,928,891 | 3/1960 | Justi et al. | 204—129 |
| 2,947,797 | 8/1960 | Justi et al. | 136—86 |

FOREIGN PATENTS

| 667,298 | 2/1952 | Great Britain. |
| 822,086 | 10/1959 | Great Britain. |

JOHN H. MACK, *Primary Examiner.*

JOHN R. SPECK, JOSEPH REBOLD, MURRAY TILLMAN, *Examiners.*

UNITED STATES PATENT OFFICE
CERTIFICATE OF CORRECTION

Patent No. 3,220,937  November 30, 1965

Karl-Hermann Friese et al.

It is hereby certified that error appears in the above numbered patent requiring correction and that the said Letters Patent should read as corrected below.

In the grant, lines 1 to 6, for "Karl-Hermann Friese, of Oberhausen-Holten, Eduard Justi, of Stuttgart-Feverbach, and Herbert Spengler and August Winsel, of Braunschweig, Germany, assignors, by mesne assignments, to Varta Aktiengesellschaft and Siemens-Schuckert-Werke Aktiengesellschaft, of Erlanger, Germany, both German corporations," read -- Karl-Hermann Friese, of Stuttgart-Feuerbach, Eduard Justi, of Braunschweig, Herbert Spengler, of Oberhausen-Holten, and August Winsel, of Braunschweig, Germany, assignors, by mesne assignments, to Varta Aktiengesellschaft, of Hagen/Westfalen, Germany, and Siemens-Schuckert-Werke Aktiengesellschaft, of Berlin and Erlangen, Germany, both German corporations, --; in the heading to the printed specification, lines 6 to 11, for "Karl-Hermann Friese, Oberhausen-Holten, Eduard Justi, Stuttgart-Feverbach, and Herbert Spengler and August Winsel, Braunschweig, Germany, assignors, by mesne assignments, to Varta Aktiengesellschaft and Siemens-Schuckert-Werke Aktiengesellschaft, Erlanger, Germany, both German corporations" read -- Karl-Hermann Friese, Stuttgart-Feuerbach, Eduard Justi, Braunschweig, Herbert Spengler, Oberhausen-Holten, and August Winsel, Braunschweig, Germany, assignors, by mesne assignments, to Varta Aktiengesellschaft, Hagen/Westfalen, Germany, and Siemens-Schuckert-Werke Aktiengesellschaft, Berlin and Erlangen, Germany, both German corporations --; column 8, line 48, after "<35μ" insert a closing parenthesis.

Signed and sealed this 20th day of September 1966.

(SEAL)
Attest:

ERNEST W. SWIDER
Attesting Officer

EDWARD J. BRENNER
Commissioner of Patents